United States Patent
Lin et al.

(10) Patent No.: US 12,439,375 B2
(45) Date of Patent: Oct. 7, 2025

(54) MUSIM PAGING RESTRICTION IN 5GS

(71) Applicant: MEDIATEK INC., Hsin-Chu (TW)

(72) Inventors: Yuan-Chieh Lin, Hsin-Chu (TW); Chien-Chun Huang-Fu, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 409 days.

(21) Appl. No.: 17/901,836

(22) Filed: Sep. 1, 2022

(65) Prior Publication Data

US 2023/0101436 A1    Mar. 30, 2023

Related U.S. Application Data

(60) Provisional application No. 63/250,294, filed on Sep. 30, 2021.

(51) Int. Cl.
| | | |
|---|---|---|
| *H04W 68/02* | (2009.01) | |
| *H04W 48/02* | (2009.01) | |
| *H04W 60/00* | (2009.01) | |
| *H04W 88/06* | (2009.01) | |

(52) U.S. Cl.
CPC .......... *H04W 68/02* (2013.01); *H04W 48/02* (2013.01); *H04W 60/005* (2013.01); *H04W 88/06* (2013.01)

(58) Field of Classification Search
CPC ... H04W 68/02; H04W 48/02; H04W 60/005; H04W 88/06
USPC ........................................................ 455/458
See application file for complete search history.

(56) References Cited

U.S. PATENT DOCUMENTS

| | | | |
|---|---|---|---|
| 12,302,231 B2* | 5/2025 | Kumar | .................. H04W 68/12 |
| 2013/0114490 A1 | 5/2013 | Fang | |
| 2014/0106742 A1 | 4/2014 | Landais | |
| 2015/0327031 A1 | 11/2015 | Zhang | |

(Continued)

FOREIGN PATENT DOCUMENTS

| | | | |
|---|---|---|---|
| WO | WO2008137486 A1 | 5/2007 | |
| WO | WO-2020209641 A1 * | 10/2020 | .......... H04W 36/142 |

(Continued)

OTHER PUBLICATIONS

Translation WO-2022169223 (Year: 2022).*

(Continued)

*Primary Examiner* — Sam K Ahn
(74) *Attorney, Agent, or Firm* — Helen Mao; Zheng Jin; Imperium Patent Works

(57) ABSTRACT

A method of determining paging restriction on downlink signals for MUSIM UEs is proposed. If a UE requests the network to support paging restriction over the first USIM, the UE can send a request message to the network, carrying a UE-preferred paging restriction information. Subsequently, the UE should then receive an accept message from the network that the paging is restricted over the first USIM based on the UE-preferred paging restriction information. As a result, when DL signaling is pending for the UE over the first USIM, the network can determine whether it should page the UE over the first USIM based on the paging restriction type indicated in the paging restriction information. Since the DL signaling is selectively restricted over USIM1, the UE can perform more important jobs over USIM2 with better performance and user experience.

9 Claims, 7 Drawing Sheets

(56) References Cited

U.S. PATENT DOCUMENTS

| | | | |
|---|---|---|---|
| 2017/0164317 A1 | 6/2017 | Kuge | |
| 2018/0324748 A1 | 11/2018 | Nord | |
| 2019/0387496 A1 | 12/2019 | Liu et al. | H04W 68/02 |
| 2022/0272660 A1 | 8/2022 | Luetzenkirchen | |
| 2022/0312548 A1 | 9/2022 | Kumar | |
| 2022/0346060 A1 | 10/2022 | Kumar | |
| 2022/0361143 A1 | 11/2022 | Kumar | |
| 2023/0040747 A1 | 2/2023 | Watfa | |
| 2024/0284400 A1 | 8/2024 | Hong | |

FOREIGN PATENT DOCUMENTS

| | | |
|---|---|---|
| WO | WO 2021/153927 A1 | 1/2021 |
| WO | WO-2022169223 A1 * | 8/2022 |

OTHER PUBLICATIONS

Europe IPO, search report for the European patent application 22198045.1, dated Feb. 10, 2023 (25 pages).

XP052056742, "3rd Generation Partnership Project; Technical Specification Group Core Network and Terminals; Non-Access-Stratum (NAS) protocol for 5G System (5GS); Stage 3; (Release 17)", vol. CT WG1, No. V17.4.1, dated Sep. 24, 2021 (863 pages). Retrieve from Internet: https://ftp.3gpp.org/Specs/archive/24_series/24.301/24301-h41.zip 24501-h41.dox.

XP052183222, "3rd Generation Partnership Project; Technical Specification Group Core Network and Terminals; Non-Access-Stratum (NAS) protocol for 5G System (5GS); Stage 3; (Release 17)", vol. CT WG1, No. V17.7.0, dated Jun. 24, 2022 (607 pages). Retrieve from Internet: https://ftp.3gpp.org/Specs/archive/24_serices/24.301/24301-h70.zip 24301-h70.dox.

Taiwan IPO, office action for the Taiwanese patent application 111137077 (no English translation is available), dated Mar. 31, 2023 (5 pages).

Europe IPO, search report for the European patent application 22197991.7, dated Feb. 10, 2023 (24 pages).

XP052056832, "3rd Generation Partnership Project; Technical Specification Group Core Network and Terminals; Non-Access-Stratum (NAS) protocol for 5G System (5GS); Stage 3; (Release 17)", vol. CT WG1, No. V17.4.1, dated Sep. 27, 2021 (863 pages). Retrieve from Internet: https://ftp.3gpp.org/Specs/archive/24_series/24.501/24501-h41.zip 24501-h41.dox.

XP052183455, "3rd Generation Partnership Project; Technical Specification Group Core Network and Terminals; Non-Access-Stratum (NAS) protocol for 5G System (5GS); Stage 3; (Release 17)", vol. CT WG1, No. V17.7.1, dated Jun. 27, 2022 (991 pages). Retrieve from Internet: https://ftp.3gpp.org/Specs/archive/24_series/24.501/24501-h71.zip 24501-h71.dox.

Taiwan Intellectual Property Office Action, dated Jul. 27, 2023 (13 pages).

3GPP 3GPP TS 24.301 V17.4.1; Technical Specification Group Core Network and Terminals; Non-Access-Stratum (NAS) protocol for Evolved Packet System (EPS); Stage 3 (Release 17) Sep. 24, 2021 3GPP.

3GPP 3GPP TS 23.401 V17.2.0; Technical Specification Group Services and System Aspects; General Packet Radio Service (GPRS) enhancements for Evolved Universal Terrestrial Radio Access Network (EUTRAN) access (Release 17) Sep. 24, 2021 3GPP.

China Telecom 3GPP TSG-CT WG1 Meeting #131-eC1-214091 E-meeting, Aug. 19-27, 2021 3GPP.

ETSI TS 24.301 v15.04.00 (Year 2018).

* cited by examiner

401

| PAGING RESTRICTION IE | | | | |
|---|---|---|---|---|
| LENGTH OF PAGING RESTRICTION CONTENTS | | | | |
| 0 SPARE | 0 SPARE | 0 SPARE | 0 SPARE | PAGING RESTRICTION TYPE |

402

| PAGING RESTRICTION IE | | | | | | | |
|---|---|---|---|---|---|---|---|
| LENGTH OF PAGING RESTRICTION CONTENTS | | | | | | | |
| 0 SPARE | 0 SPARE | 0 SPARE | 0 SPARE | PAGING RESTRICTION TYPE | | | |
| PSI (7) | PSI (6) | PSI (5) | PSI (4) | PSI (3) | PSI (2) | PSI (1) | PSI (0) |
| PSI (15) | PSI (14) | PSI (13) | PSI (12) | PSI (11) | PSI (10) | PSI (9) | PSI (8) |

403

| PAGING RESTRICTION TYPE | | | | |
|---|---|---|---|---|
| 0 | 0 | 0 | 1 | ALL PAGING IS RESTRICTED |
| 0 | 0 | 1 | 0 | ALL PAGING IS RESTRICTED EXCEPT FOR VOICE SERVICE |
| 0 | 0 | 1 | 1 | ALL PAGING IS RESTRICTED EXCEPT FOR SPECIFIED PDU SESSION(S) |
| 0 | 1 | 0 | 0 | ALL PAGING IS RESTRICTED EXCEPT FOR VOICE SERVICE AND SPECIFIED PDU SESSION(S) |

PAGING RESTRICTION IE IN 5GS

| PAGING RESTRICTION IE | | | | |
|---|---|---|---|---|
| LENGTH OF PAGING RESTRICTION CONTENTS | | | | |
| 0 SPARE | 0 SPARE | 0 SPARE | 0 SPARE | PAGING RESTRICTION TYPE |

702

| PAGING RESTRICTION IE | | | | | | | |
|---|---|---|---|---|---|---|---|
| LENGTH OF PAGING RESTRICTION CONTENTS | | | | | | | |
| 0 SPARE | 0 SPARE | 0 SPARE | 0 SPARE | PAGING RESTRICTION TYPE | | | |
| EBI (7) | EBI (6) | EBI (5) | EBI (4) | EBI (3) | EBI (2) | EBI (1) | EBI (0) |
| EBI (15) | EBI (14) | EBI (13) | EBI (12) | EBI (11) | EBI (10) | EBI (9) | EBI (8) |

703

| PAGING RESTRICTION TYPE | | | | |
|---|---|---|---|---|
| 0 | 0 | 0 | 1 | ALL PAGING IS RESTRICTED |
| 0 | 0 | 1 | 0 | ALL PAGING IS RESTRICTED EXCEPT FOR VOICE SERVICE |
| 0 | 0 | 1 | 1 | ALL PAGING IS RESTRICTED EXCEPT FOR SPECIFIED PDN CONNECTION(S) |
| 0 | 1 | 0 | 0 | ALL PAGING IS RESTRICTED EXCEPT FOR VOICE SERVICE AND SPECIFIED PDN CONNECTION(S) |

PAGING RESTRICTION IE IN EPS

FIG. 7

MUSIM PAGING RESTRICTION IN 5GS

CROSS REFERENCE TO RELATED APPLICATION

This application claims priority under 35 U.S.C. § 119 from U.S. Provisional Application No. 63/250,294 entitled "MUSIM Paging Restriction," filed on Sep. 30, 2021, the subject matter of which is incorporated herein by reference.

TECHNICAL FIELD

The disclosed embodiments relate generally to wireless communication systems, and, more particularly, to determine whether the network pages UE if there is a downlink signaling message when paging restriction is applied.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G EPS system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (e.g., eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board has decided to focus the future NGMN activities on defining the end-to-end requirements for 5G new radio (NR) systems. The base stations in 5G systems (5GS) are referred to as Next Generation Node-Bs (e.g., gNodeBs or gNBs).

The universal subscriber identity module (USIM) is one of several software applications that resides in the UE, called the universal integrated circuit card (UICC). As smartphones and services became more affordable, their users have tended to use different mobile subscriptions (i.e., USIM cards) for travel, business, and personal needs. Many UEs now support multiple USIM cards (MUSIM) for registration and operation over different USIM simultaneously. UE with multiple USIMs is capable of maintaining a separate registration state with a PLMN for each USIM at least over 3GPP Access and supporting one or more of the MUSIM features: Connection Release Supported, Paging Cause Indication for Voice Service Supported, Reject Paging Request Supported, Paging Timing Collision Control, and Paging Restriction Supported.

The UE and the 5GS/EPS network may support Paging Restriction for downlink user data. If the network indicates that the network supports Paging Restriction feature, the UE may indicate Paging Restriction Information in the Service Request or Registration Request message in 5G, or in the Service Request, Extended Service Request or Tracking Area Update Request message in 4G. Different paging restriction information may indicate a) all paging is restricted, b) all paging is restricted, except paging for voice service (IMS service), c) all paging is restricted, except for certain specific PDU sessions/PDN connections, or d) all paging is restricted, except paging for voice service and certain specific PDU sessions/PDN connections.

If the network has downlink signaling pending for a MUSIM UE and the network has stored paging restriction configurations/information of the MUSIM UE, it is unclear for UE and NW what exactly the different configurations mean. It needs to be clearly specified what NW procedures or downlink messages are pagable and what are not pagable, so that the network side implementation is consistent among different vendors. For UE side, if with a certain paging restriction type the NW will not page the UE, the UE needs to consider that its Registration state and its PDU state may be not synchronized before removing the paging restriction type with the NW.

SUMMARY

A method of determining paging restriction on downlink signals for MUSIM UEs is proposed. If a UE requests the network to support paging restriction over the first USIM, the UE can send a request message to the network, carrying a UE-preferred paging restriction information. Subsequently, the UE should then receive an accept message from the network that the paging is restricted over the first USIM based on the UE-preferred paging restriction information. As a result, when DL signaling is pending for the UE over the first USIM, the network can determine whether it should page the UE over the first USIM based on the paging restriction type indicated in the paging restriction information. Since the DL signaling is selectively restricted over USIM1, the UE can perform more important jobs over USIM2 with better performance and user experience.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 4 illustrates one embodiment of a paging restriction IE with paging restriction type for MUSIM UE in 5GS network in accordance with one novel aspect.

FIG. 7 illustrates one embodiment of a paging restriction IE with paging restriction type for MUSIM UE in EPS network in accordance with one novel aspect.

DETAILED DESCRIPTION

Reference will now be made in detail to some embodiments of the invention, examples of which are illustrated in the accompanying drawings.

Figure 1:
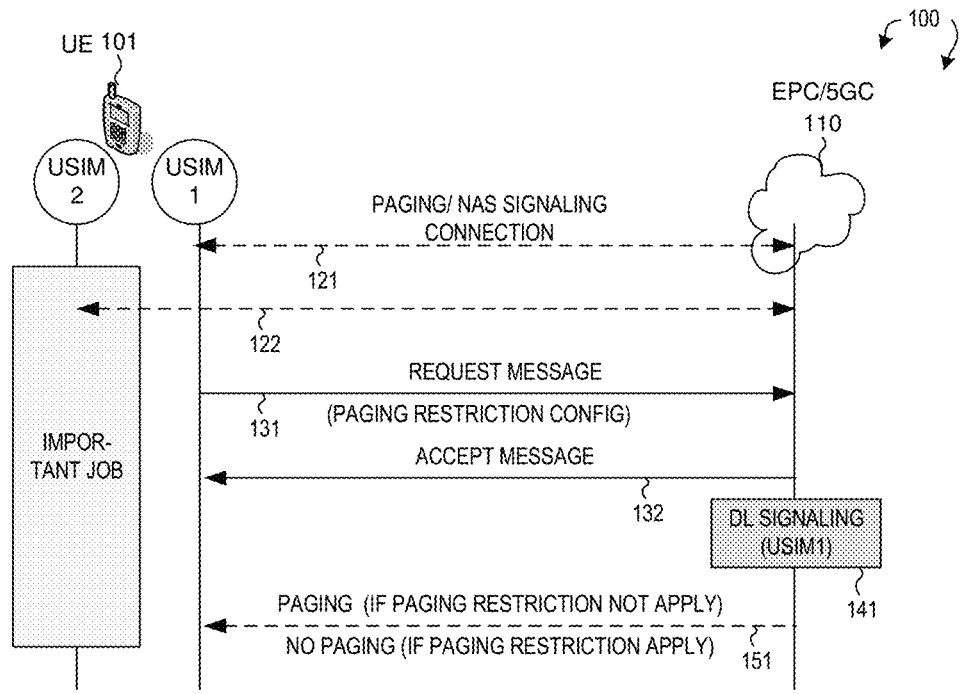
FIG. 1 illustrates a user equipment (UE) handling paging restriction for supporting Multiple USIM (MUSIM) in an EPS/5GS network in accordance with one novel aspect.

FIG. 1 illustrates a user equipment (UE) handling paging restriction for supporting Multiple USIM (MUSIM) in an EPS/5GS network 100 in accordance with one novel aspect. In 3GPP LTE and NR, the radio access network (a plurality of base stations, e.g., eNodeBs, or Next Generation Node-Bs (gNodeBs)), communicating with a plurality of mobile stations referred as user equipment (UEs). Orthogonal Frequency Division Multiple Access (OFDMA) has been selected for NR downlink (DL) radio access scheme due to its robustness to multipath fading, higher spectral efficiency, and bandwidth scalability. In both LTE and NR networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink (UL) control information. Physical Uplink Shared Channel (PUSCH) is used for uplink data. In addition, physical random-access channel (PRACH) is used for non-contention-based RACH.

In Non-Access Stratum (NAS) layer, the access and mobility function (AMF) and the session management function (SMF) (or MME in 4G) communicate with RAN and 5GC/EPC 110 for access and mobility management and PDU session/PDN connection management of wireless access devices in the EPS/5GS network 100. In the example of FIG. 1, UE 101 supports multiple universal subscriber identity module (MUSIM) for registration and operation with EPC/5GC 110 over different USIM simultaneously. The two or more different USIMs can register to same EPS, same 5GS, different EPSs, different 5GSs, or one or more EPS and one or more 5GS. When UE 101 receives paging and/or establishes a NAS signaling connection on a first USIM1 (121), UE 101 may need to switch a second USIM2 due to more important activities are started or more important jobs ongoing on the second USIM2 (122) with better performance and user experience.

UE with multiple USIMs is capable of maintaining a separate registration state with a PLMN for each USIM at least over 3GPP Access and supporting one or more of the MUSIM features: Connection Release Supported, Paging Cause Indication for Voice Service Supported, Reject Paging Request Supported, Paging Timing Collision Control, and Paging Restriction Supported. If UE 101 requests the network to support paging restriction over the first USIM, UE 101 can send a request message to the network (as depicted in step 131), carrying a UE-preferred paging restriction configuration/information. The UE 101 can include its paging restriction preference in the Paging restriction IE in an EXTENDED SERVICE REQUEST message, a CONTROL PLANE SERVICE REQUEST message, or a SERVICE REQUEST message. Subsequently, the UE 101 should then receive an accept message from the network that the paging is restricted over the first USIM based on the UE-preferred paging restriction configuration/information. As a result, when DL signaling is pending for UE 101 over the first USIM (step 141), the network can determine whether it should page UE 101 over the first USIM based on the paging restriction type indicated in the paging restriction configuration/information (step 151). Since the DL signaling is selectively restricted over USIM1, the UE 101 can perform more important jobs over USIM2 with better performance and user experience.

Figure 2:
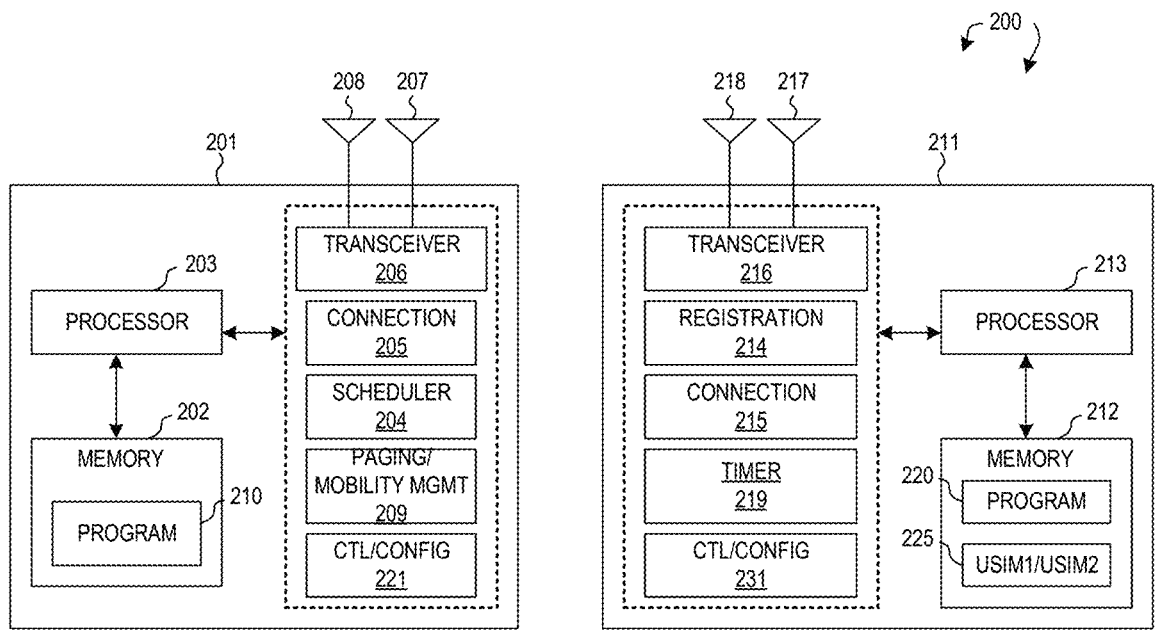
FIG. 2 is a simplified block diagram of a UE and a base station in accordance with various embodiments of the present invention.

FIG. 2 is a simplified block diagram of wireless devices 201 and 211 in accordance with embodiments of the present invention. For wireless device 201 (e.g., a base station), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 and multiple USIM cards 225 to control the operations of the wireless device 211.

The wireless devices 201 and 211 also include several functional modules and circuits that can be implemented and configured to perform embodiments of the present invention. In the example of FIG. 2, wireless device 201 is a base station that includes an RRC connection handling module 205, a scheduler 204, a paging and mobility management module 209, and a control and configuration circuit 221. Wireless device 211 is a UE that includes a connection handling module 215, a registration module 214, a paging and mobility handling module 219, and a control and configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow base station 201 and UE 211 to perform embodiments of the present invention.

In one example, the base station 201 establishes signaling connection with the UE 211 via connection handling circuit 205, schedules downlink and uplink transmission for UEs via scheduler 204, performs paging, mobility, and handover management via mobility management module 209, and provides control and configuration information to UEs via configuration circuit 221. The UE 211 performs registration with the network via registration module 214, establishes signaling connection via connection handling circuit 215, maintains timer 219, and obtains configuration information via control and configuration circuit 231. In one novel aspect, UE 211 supports MUSIM and handles releasing of a NAS signaling connection, rejection of paging, or paging restriction over one USIM to improve the service of another USIM.

Paging Restriction in 5GS

Figure 3:
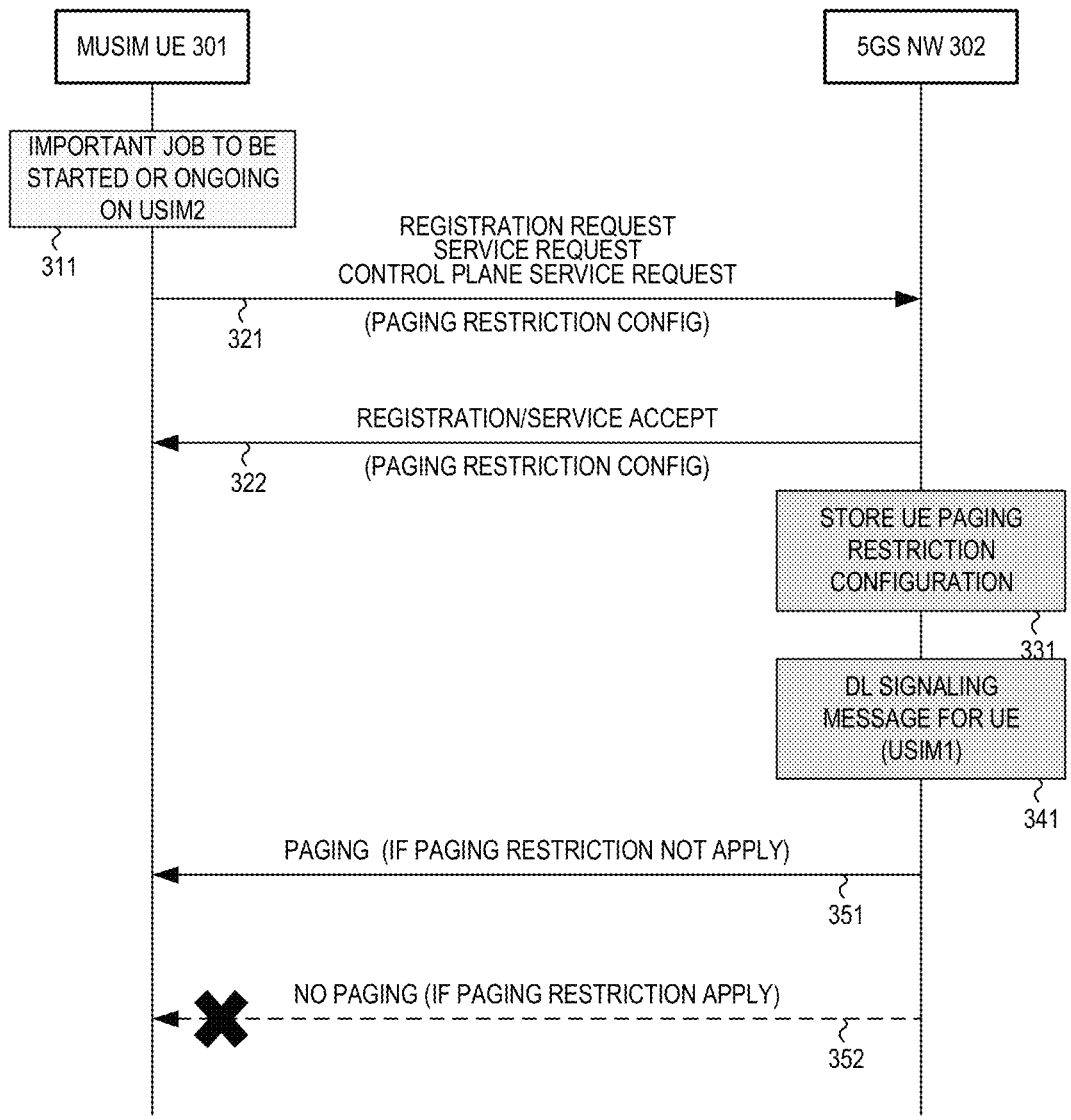
FIG. 3 illustrates a sequence flow of handling paging restriction for MUSIM UE in 5GS network in accordance with one novel aspect.

FIG. 3 illustrates a sequence flow of handling paging restriction for MUSIM UE in 5GS network in accordance with one novel aspect. UE 301 supports multiple USIM cards include USIM1 and USIM2. MUSIM UE 301 and the 5GS network 302 support paging restriction to improve performance on one of the USIM cards. In step 311, UE 301 has more important job to be started or ongoing on USIM2. UE 301 thus wants to apply paging restriction on USIM1, so that only specific downlink signals are paged by the network. In step 321, UE 301 transmits a request message to the 5GS network 302, carrying a paging restriction information IE. The request message can be a REGISTRATION REQUEST message, a SERVICE REQUEST message, or a CONTROL PLANE SERVICE REQUEST message. The paging restriction information IE comprises a paging restriction type, indicating the different paging restriction information desired by the UE 301. In step 322, 5GS NW 302 sends an accept message back to UE 301, indicating that the network has accepted the paging restriction information for UE 301. The accept message can be a REGISTRATION ACCEPT message, or a SERVICE ACCEPT message.

In step 331, 5GS NW 302 stores the paging restriction information for UE 301, which includes the paging restriction type for USIM1. In step 341, 5GS NW 302 has a pending downlink signaling for UE 301 over USIM1. The network thus needs to determine whether it should page UE 301 over USIM1, based on the stored paging information. In step 351, if NW 302 determines that the paging restriction does not apply to the DL signaling, e.g., the DL signaling belongs to one of the paging restriction exceptions, then NW 302 sends the paging to UE 301 over USIM1. Otherwise, in step 352, if NW 302 determines that the paging restriction does apply to the DL signaling, e.g., the DL signaling does not belong to one of the paging restriction exceptions, then NW 302 does not send the paging to UE 301 over USIM1.

FIG. 4 illustrates one embodiment of a paging restriction IE with paging restriction type for MUSIM UE in 5GS network in accordance with one novel aspect. A Multi-USIM UE and the 5GS network may support Paging Restriction. A Multi-USIM UE, if the AMF indicates that the network supports Paging Restriction feature, may indicate Paging Restriction Information in the Service Request or Registration Request message (including the case where the Registration Request is sent due to mobility outside the Registration Area, i.e. before detecting whether the network supports the feature in the new Tracking Area, provided that the network has already indicated support for Paging Restriction feature in the current stored Registration Area).

Based on operator policy the AMF may accept or reject the Paging Restriction Information requested by the UE. If the AMF accepts the Paging Restriction Information from the UE, the AMF stores the Paging Restriction Information from the UE in the UE context. If the AMF rejects the Paging Restriction Information, the AMF removes any stored Paging Restriction Information from the UE context and discards the UEs requested Paging Restriction Information. The AMF informs the UE about the acceptance/rejection of the requested Paging Restriction Information in the Tracking Area Update Accept or Service Accept message. If the UE does not provide any Paging Restriction Information in the Service Request over 3GPP access or the Registration Request over 3GPP access, the AMF removes any stored Paging Restriction Information from the UE context.

The Paging Restriction IE is depicted by 401 and 402 in FIG. 4. It includes a paging restriction type, which is depicted by 403 in FIG. 4. The paging restriction type may indicate any of the following: a) all paging is restricted; or b) all paging is restricted, except paging for voice service (IMS voice); or c) all paging is restricted, except for certain PDU Session(s); or d) all paging is restricted, except paging for voice service (IMS voice) and certain PDU session(s). For a) and b), the paging restriction IE is depicted by 401. For c) and d), the paging restriction IE is depicted by 402, which comprises both the paging restriction type, and PSI that identifies the certain PDU sessions corresponding to the paging restriction.

In one embodiment, the paging restriction type is set to a) all paging is restricted. It means that the network does not page the UE.

In one embodiment, the paging restriction type is set to b) all paging is restricted, except paging for voice service (IMS voice). It means that the network is allowed to initiate the paging procedure for the UE only when the pending downlink signaling message is critical to voice service availability. A DL signaling message is critical to voice service availability means that the message is a DL 5GMM signaling message (e.g., DEREGISTRATION REQEUEST), or a DL 5GSM signaling message of any PDU session of a voice service (e.g., PDU SESSION MODIFICATION COMMAND or PDU SESSION RELEASE COMMAND for IMS PDU). In one example, the network shall page the UE only when the network has MMTEL voice call related downlink user data pending for the UE, or only when the network has MMTEL video call related downlink user data pending for the UE.

In another embodiment, the paging restriction type is set to c) all paging is restricted, except paging for specified PDU sessions. It means that the network is allowed to initiate the paging procedure for the UE only when the pending downlink signaling message is critical to the specified PDU sessions availability. A DL signaling message is critical to specified PDU sessions means that the message is a DL 5GMM signaling message (e.g., DEREGISTRATION REQUEST), or for PDU session(s) that paging is not restricted based on the stored paging restriction, the network has downlink 5GSM signaling pending. In one example, the network shall page the UE when 1) for any of the PDU session(s) that paging is not restricted based on the stored paging restriction preference, the network i) has downlink user data pending for the UE; or ii) initiates Network-requested PDU session modification procedure for the UE; or iii) initiates Network-requested PDU session release procedure for the UE; or 2) the network initiates network-initiated de-registration procedure for the UE.

In yet another embodiment, the paging restriction type is set to d) all paging is restricted, except paging for voice service (IMS voice) and except for specified PDU sessions. It means that the network is allowed to initiate the paging procedure for the UE only when the pending downlink signaling message is critical to voice service availability or critical to the specified PDU sessions availability. A DL signaling message is critical to voice service or critical to specified PDU sessions means that the message is a DL 5GMM signaling message, or is a DL 5GSM signaling message of any PDU session of voice service, or for PDU session(s) that paging is not restricted based on the stored paging restriction, the network has downlink 5GSM signaling pending. The paging restriction type d) is actually a combination of paging restriction type b) and type c), e.g., both paging restriction exceptions listed in restriction type b) and restriction type c) should be applied in paging restriction type d).

Figure 5:
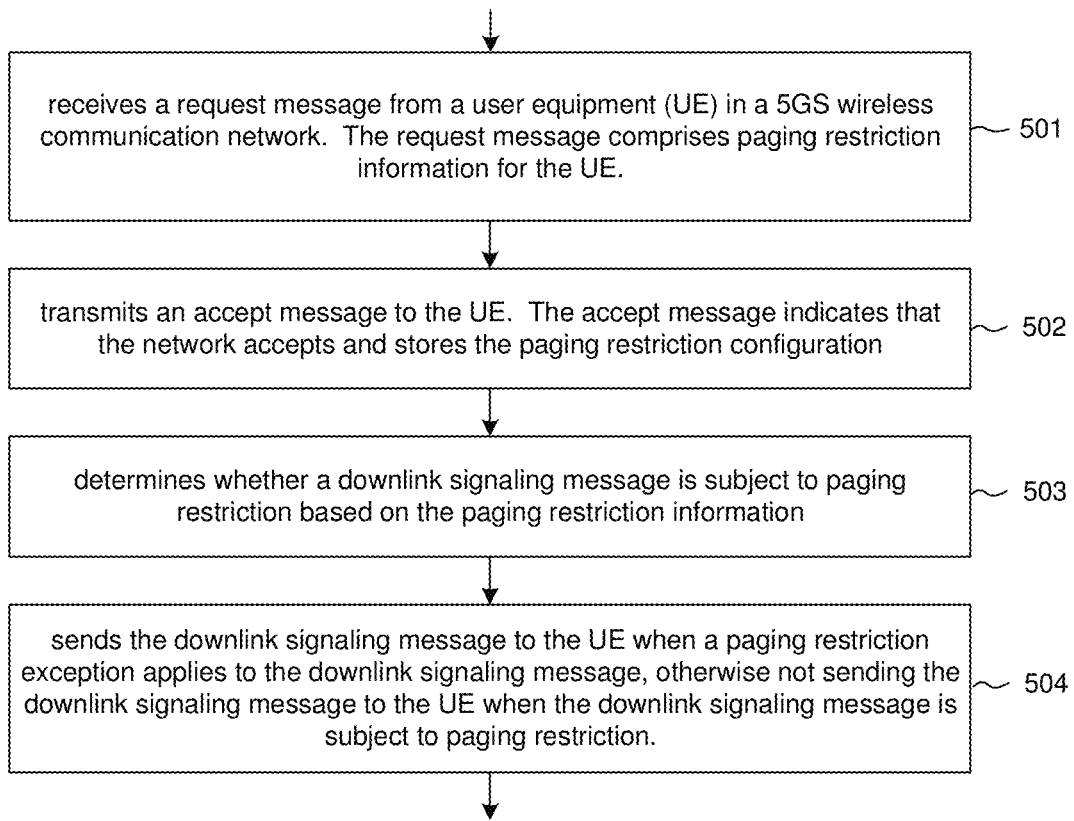
FIG. 5 is a flow chart of a method of handling paging restriction for MUSIM UE in 5GS in accordance with one novel aspect of the present invention.

FIG. 5 is a flow chart of a method of handling paging restriction for MUSIM UE in 5GS in accordance with one novel aspect of the present invention. In step 501, a network entity receives a request message from a user equipment (UE) in a 5GS wireless communication network. The request message comprises paging restriction information for the UE. In step 502, the network entity transmits an accept message to the UE. The accept message indicates that the network accepts and stores the paging restriction information. In step 503, the network entity determines whether a downlink signaling message is subject to paging restriction based on the paging restriction information. In step 504, the network entity sends the downlink signaling message to the UE when a paging restriction exception applies to the downlink signaling message. In one embodiment, the paging restriction information is provided by the UE to restrict paging on a first USIM when there are more important jobs on a second USIM of the UE.

Paging Restriction in EPS

Figure 6:
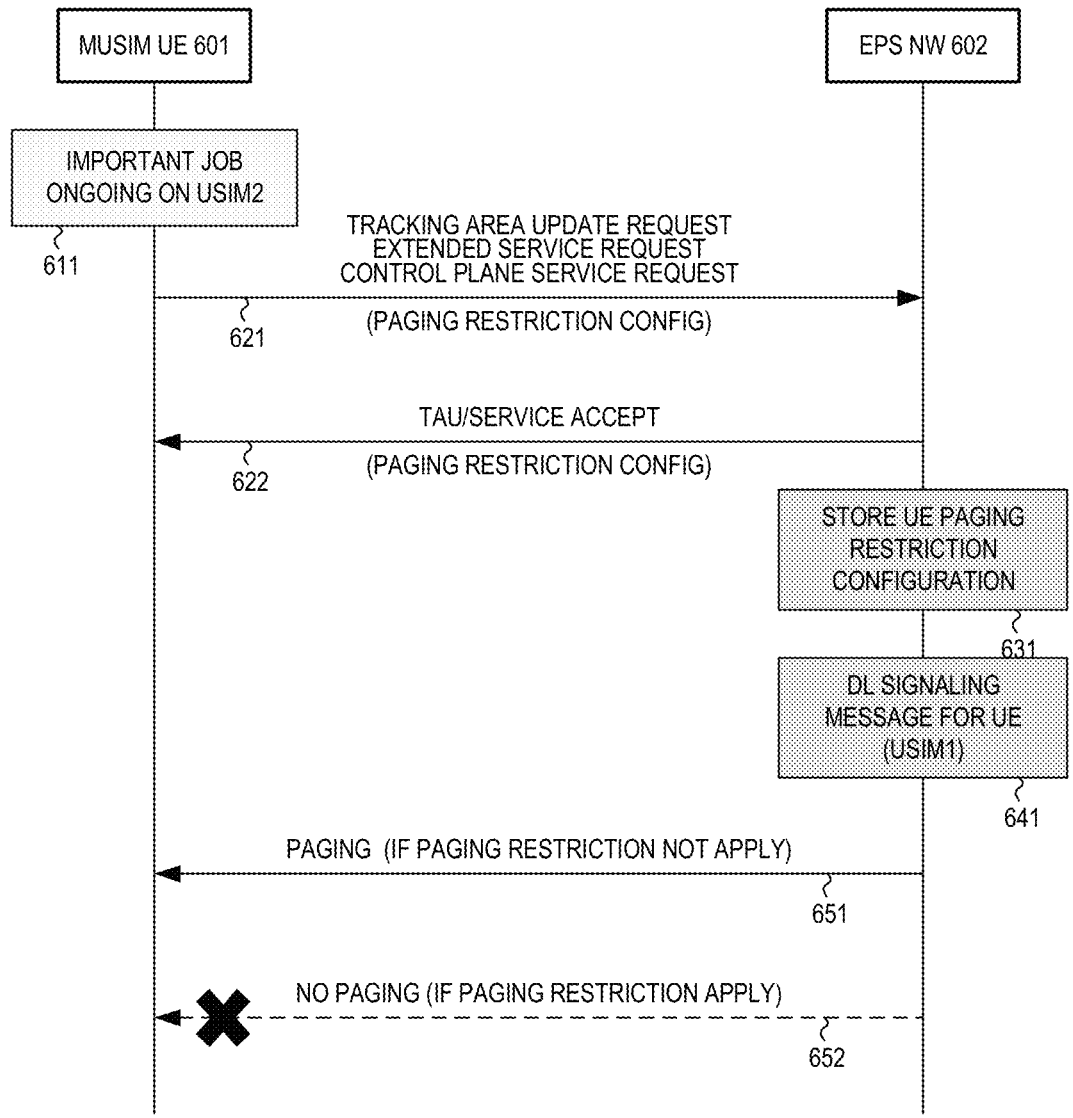
FIG. 6 illustrates a sequence flow of handling paging restriction for MUSIM UE in EPS network in accordance with one novel aspect.

FIG. 6 illustrates a sequence flow of handling paging restriction for MUSIM UE in EPS network in accordance with one novel aspect. UE 601 supports multiple USIM cards include USIM1 and USIM2. MUSIM UE 601 and the EPS network 602 support paging restriction to improve performance on one of the USIM cards. In step 611, UE 601 has more important job to be started or ongoing on USIM2. UE 601 thus wants to apply paging restriction on USIM1, so that only specific downlink signals are paged by the network. In step 621, UE 601 transmits a request message to the EPS network 602, carrying a paging restriction information IE. The request message can be a TRACKING AREA UPDATE REQUEST message, an EXTENDED SERVICE REQUEST message, or a CONTROL PLANE SERVICE REQUEST message. The paging restriction information IE comprises a paging restriction type, indicating the different paging information desired by the UE 601. In step 622, EPS NW 602 sends an accept message back to UE 601, indicating that the network has accepted the paging restriction information for UE 601. The accept message can be a TAU ACCEPT message, or a SERVICE ACCEPT message.

In step 631, EPS NW 602 stores the paging restriction information for UE 601, which includes the paging restriction type for USIM1. In step 641, EPS NW 602 has a pending downlink signaling for UE 601 over USIM1. The network thus needs to determine whether it should page UE 601 over USIM1, based on the stored paging restriction information. In step 651, if NW 602 determines that the paging restriction does not apply to the DL signaling, e.g., the DL signaling belongs to one of the paging restriction exceptions, then NW 602 sends the paging to UE 601 over USIM1. Otherwise, in step 652, if NW 602 determines that the paging restriction does apply to the DL signaling, e.g., the DL signaling does not belong to one of the paging restriction exceptions, then NW 602 does not send the paging to UE 601 over USIM1.

FIG. 7 illustrates one embodiment of a paging restriction IE with paging restriction type for MUSIM UE in EPS network in accordance with one novel aspect. A Multi-USIM UE and the network may support Paging Restriction. A Multi-USIM UE, if the MME indicates that the network supports Paging Restriction feature, may indicate Paging Restriction Information in an Extended Service Request or a Tracking Area Update Request (including the case where the Tracking Area Update is performed due to mobility to a Tracking Area outside the current Tracking Area List, i.e. before detecting whether the network supports the feature in the new Tracking Area, provided that the network has already indicated support for Paging Restrictions in the current Tracking Area List).

The MME may accept or reject the Paging Restriction Information requested by the UE. If the MME accepts the Paging Restriction Information from the UE, the MME stores the Paging Restriction Information from the UE in the UE context. If the MME rejects the Paging Restriction Information the MME removes any stored Paging Restriction Information from the UE context and discards the UEs requested Paging Restriction Information. The MME informs the UE about the acceptance/rejection of the requested Paging Restriction Information in the Tracking Area Update Accept or Service Accept message. If the UE does not provide Paging Restriction Information in the Extended Service Request message or the Tracking Area Update Request message, or if the UE initiates the Service Request procedure, the MME removes any stored Paging Restriction Information from the UE context.

The Paging Restriction IE is depicted by 701 and 702 in FIG. 7. It includes a paging restriction type, which is depicted by 703 in FIG. 7. The paging restriction type may indicate any of the following: a) all paging is restricted; or b) all paging is restricted, except paging for voice service (MMTel voice or CS domain voice); or c) all paging is restricted, except for certain PDN Connection(s); or d) all paging is restricted, except paging for certain PDN Connection(s) and voice service (MMTel voice or CS domain voice). For a) and b), the paging restriction IE is depicted by 701. For c) and d), the paging restriction IE is depicted by 702, which comprises both the paging restriction type, and EBI that identifies the certain PDN Connections.

In one embodiment, the paging restriction type is set to a) all paging is restricted. It means that the network shall not initiate the paging procedure for EPS services using S-TMSI with CN domain indicator set to "PS" for the UE.

In one embodiment, the paging restriction type is set to b) all paging is restricted, except paging for voice service. It means that the network is allowed to initiate the paging procedure for the UE only when the pending downlink signaling message is critical to voice service availability. A DL signaling message is critical to voice service means that the message is a DL EMM signaling message (e.g., DETACH REQEUST), or a DL ESM signaling message of any PDN connection availability of a voice service. In one example, the network shall initiate the paging procedure for EPS services using S-TMSI with CN domain indicator set to "PS" for the UE only when the network has: 1) MMTEL voice call related downlink user data pending for the UE; or 2) MMTEL video call related downlink user data pending for the UE.

In another embodiment, the paging restriction type is set to c) all paging is restricted, except paging for specified PDN connections. It means that the network is allowed to initiate the paging procedure for the UE only when the pending downlink signaling message is critical to the specified PDN connections availability. A DL signaling message is critical to specified PDN connections means that the message is a DL EMM signaling message like DETACH REQUEST, or for PDN connection(s) that paging is not restricted based on the stored paging restriction, the network has downlink ESM signaling pending. In one example, the network shall initiate the paging procedure for EPS services using S-TMSI with CN domain indicator set to "PS" for the UE when: for any of the PDN connection(s) that paging is not restricted based on the stored paging restriction preferences, the network: i) has downlink user data pending for the UE; or ii) initiates EPS bearer context deactivation procedure for the UE; or iii) initiates EPS bearer context modification procedure for the UE.

In yet another embodiment, the paging restriction type is set to d) all paging is restricted, except paging for voice service and except for specified PDN connections. It means that the network is allowed to initiate the paging procedure for the UE only when the pending downlink signaling message is critical to voice service availability or critical to the specified PDN connections availability. A DL signaling message is critical to voice service or critical to specified PDN connections means that the message is a DL EMM signaling message, or is a DL ESM signaling message of any PDN connection of voice service, or for PDN connection(s) that paging is not restricted based on the stored paging restriction, the network has downlink ESM signaling pending. The paging restriction type d) is actually a combination of paging restriction type b) and type c), e.g., both paging restriction exceptions listed in restriction type b) and restriction type c) should be applied in paging restriction type d).

Figure 8:
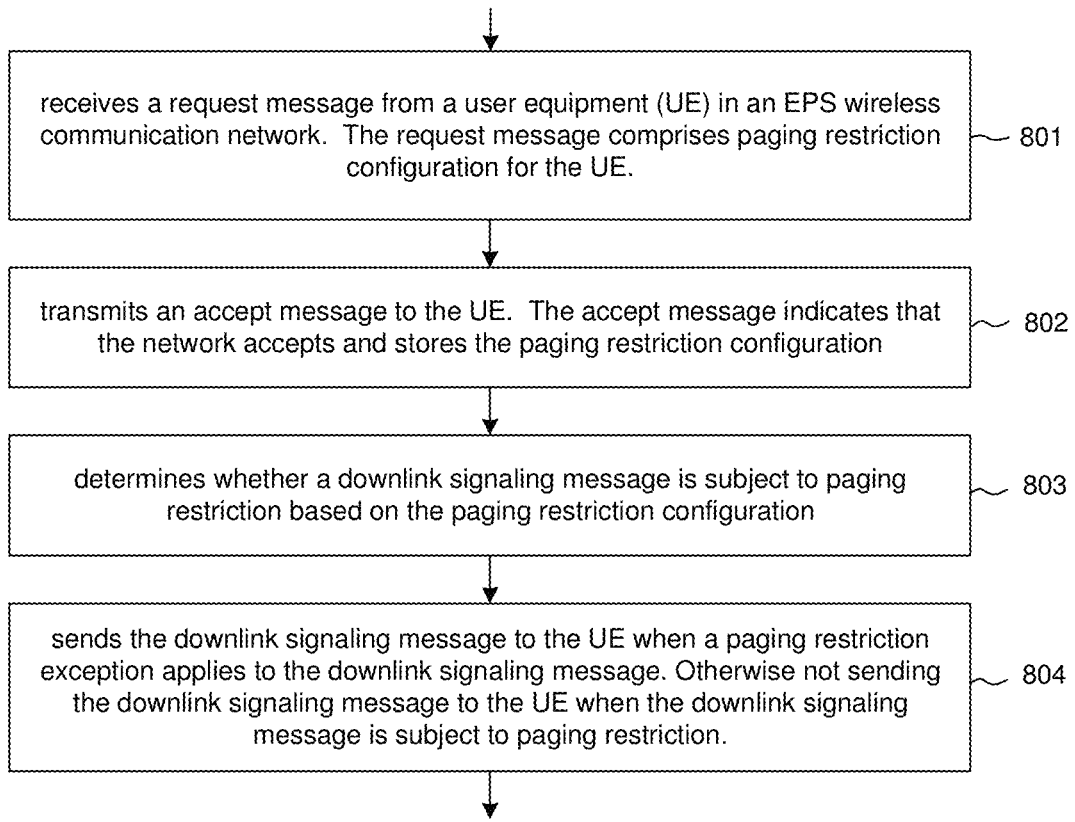
FIG. 8 is a flow chart of a method of handling paging restriction for MUSIM UE in EPS in accordance with one novel aspect of the present invention.

FIG. 8 is a flow chart of a method of handling paging restriction for MUSIM UE in EPS in accordance with one novel aspect of the present invention. In step 801, a network entity receives a request message from a user equipment (UE) in an evolved packet system (EPS) wireless communication network. The request message comprises paging restriction information for the UE. In step 802, the network entity transmits an accept message to the UE. The accept message indicates that the network accepts and stores the paging restriction information. In step 803, the network entity determines whether a downlink signaling message is subject to paging restriction based on the paging restriction information. In step 804, the network entity sends the downlink signaling message to the UE when a paging restriction exception applies to the downlink signaling message. In one embodiment, the paging restriction information is provided by the UE to restrict paging on a first USIM when there are more important jobs on a second USIM of the UE.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving a request message from a user equipment (UE) by a network entity in a 5G system (5GS) wireless communication network, wherein the request message comprises paging restriction information for the UE, wherein the paging restriction information indicates that all paging is restricted except for voice service;
   transmitting an accept message to the UE, wherein the accept message indicates that the network accepts and stores the paging restriction information;
   determining whether a downlink (DL) signaling message is subject to paging restriction based on the paging restriction information; and
   sending the downlink signaling message to the UE when a paging restriction exception applies to the downlink signaling message, wherein the network initiates a paging procedure for the UE when the DL signaling message is a DL 5GMM signaling message or a DL 5GSM signaling message of a PDU session of voice service.

2. The method of claim 1, wherein the request message is a REGISTRATION REQUEST message, a SERVICE REQUEST message, or a CONTROL PLANE SERVICE REQUEST message.

3. The method of claim 1, wherein the accept message is a REGISTRATION ACCEPT message, or a SERVICE ACCEPT message with a Paging restriction decision set to "paging restriction is accepted".

4. A method, comprising:
   receiving a request message from a user equipment (UE) by a network entity in a 5G system (5GS) wireless communication network, wherein the paging restriction information indicates that all paging is restricted except for specified PDU sessions;
   transmitting an accept message to the UE, wherein the accept message indicates that the network accepts and stores the paging restriction information;
   determining whether a downlink (DL) signaling message is subject to paging restriction based on the paging restriction information; and
   sending the downlink signaling message to the UE when a paging restriction exception applies to the downlink signaling message, wherein the network initiates a paging procedure for the UE when the DL signaling message is a DL 5GMM signaling message or a DL 5GSM signaling message of a specified PDU session that is not restricted.

5. The method of claim 4, wherein the request message is a REGISTRATION REQUEST message, a SERVICE REQUEST message, or a CONTROL PLANE SERVICE REQUEST message.

6. The method of claim 4, wherein the accept message is a REGISTRATION ACCEPT message, or a SERVICE ACCEPT message with a Paging restriction decision set to "paging restriction is accepted".

7. A method, comprising:
   receiving a request message from a user equipment (UE) by a network entity in a 5G system (5GS) wireless communication network, wherein the request message comprises paging restriction information for the UE, wherein the paging restriction information indicates that all paging is restricted except for voice service and except for specified PDU sessions;
   transmitting an accept message to the UE, wherein the accept message indicates that the network accepts and stores the paging restriction information;
   determining whether a downlink (DL) signaling message is subject to paging restriction based on the paging restriction information; and
   sending the downlink signaling message to the UE when a paging restriction exception applies to the downlink signaling message, wherein the network initiates a paging procedure for the UE when the DL signaling message is a DL 5GMM signaling message, a DL 5GSM signaling message of a PDU session of voice service, or a DL 5GSM signaling message of a specified PDU session that is not restricted.

8. The method of claim 7, wherein the request message is a REGISTRATION REQUEST message, a SERVICE REQUEST message, or a CONTROL PLANE SERVICE REQUEST message.

9. The method of claim 7, wherein the accept message is a REGISTRATION ACCEPT message, or a SERVICE ACCEPT message with a Paging restriction decision set to "paging restriction is accepted".

* * * * *